United States Patent [19]

Dayan et al.

[11] Patent Number: 5,063,496
[45] Date of Patent: Nov. 5, 1991

[54] SIGNALING ATTEMPTED TRANSFER TO PROTECTED ENTRY POINT BIOS ROUTINE

[75] Inventors: Richard A. Dayan; Douglas R. Geisler; Scott G. Kinnear, all of Boca Raton; James F. Macon, Jr., Boynton Beach; William H. Schwartz, Delray Beach, all of Fla.

[73] Assignee: International Business Machines Corporation, Armonk, N.Y.

[21] Appl. No.: 201,651

[22] Filed: Jun. 1, 1988

[51] Int. Cl.$^5$ .................. G06F 9/00; G06F 12/00
[52] U.S. Cl. .................. 395/700; 364/280.9; 364/281.3; 364/281.7; 364/975.4; 364/976; 364/DIG. 1; 364/DIG. 2
[58] Field of Search ... 364/200 MS File, 900 MS File

[56] References Cited
U.S. PATENT DOCUMENTS

| | | | |
|---|---|---|---|
| 4,328,542 | 5/1982 | Anastas et al. | 364/200 |
| 4,519,032 | 5/1985 | Mendell | 364/200 |
| 4,584,639 | 4/1986 | Hardy | 364/200 |
| 4,636,947 | 1/1987 | Ward | 364/200 |
| 4,654,783 | 3/1987 | Veres et al. | 364/200 |
| 4,747,040 | 5/1988 | Blanset et al. | 364/200 |
| 4,858,117 | 8/1989 | DiChiara et al. | 364/200 |
| 4,926,476 | 5/1990 | Covey | 364/200 |

Primary Examiner—Thomas C. Lee
Assistant Examiner—Ayni Mohamed
Attorney, Agent, or Firm—Anibal Jose Cortina

[57] ABSTRACT

A data processing system has a microprocessor, a memory system and a plurality of system devices the operation of which is controlled by BIOS routines. The BIOS routines are accessed through protected entry points. When an application program attempts to access one of the routines by using a hard coded instruction for jumping to such entry point, a BIOS signaling routine is executed which provides a signal to an operating system allowing the operating system to control the access without being bypassed.

1 Claim, 2 Drawing Sheets

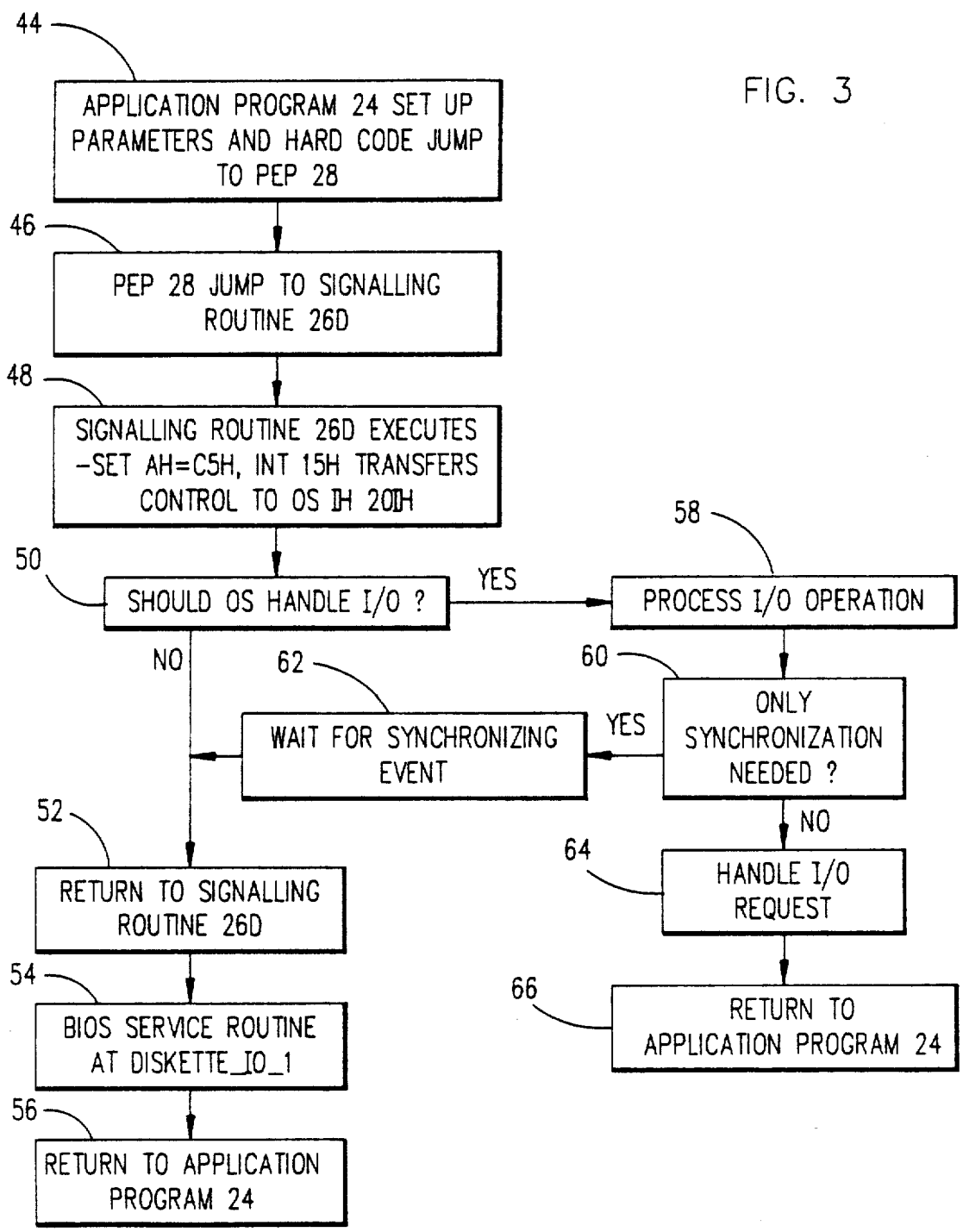

ated Business Machines Corporation of Armonk, N.Y.

SIGNALING ATTEMPTED TRANSFER TO PROTECTED ENTRY POINT BIOS ROUTINE

FIELD OF THE INVENTION

This invention relates to data processing systems and, more particularly, to improvements in control programs for multitasking data processing systems in which application programs include hard coded instructions for transferring control to protected entry points in basic input/output system (BIOS) routines.

BACKGROUND

International Business Machines Corporation (IBM) has marketed for the last several years different systems of personal computers that have evolved from single task systems into multitasking systems. Such evolution involved changes in both the hardware and software while maintaining an upwards compatibility throughout the newer systems for running old application programs. Early systems included a BIOS and a personal computer disk operating system (PC/DOS) that interacted with the application program through several software interrupt routines that relieved the application programmer from having to write or create routines common to many different application programs. BIOS was intended to provide routines for controlling operation of the major I/O devices and relieve the application programmer from concern about hardware device characteristics. The recommended manner of invoking or transferring control to the DOS or BIOS routines was to use the well known INT instruction.

BIOS was intended to be invoked by loading the microprocessor's registers with parameters and issuing an INT instruction. Some application programs developed for the IBM PC and XT systems access BIOS in an unprescribed manner. Such application programs are referred to as ill-behaved and use the microprocessor register conventions to pass parameters but use a different invocation method. First, the application programs setup the required return parameters on a stack. Second, the application programs load the microprocessor registers with parameters depending on the BIOS function requested. Then, the programs either jump or call BIOS via its physical address (commonly referred to as a "hard coded" address) in ROM memory. The BIOS memory area was expanded on the IBM AT system. It was not possible to keep the individual BIOS routines or instructions at the same starting address as in prior systems. Directly accessing BIOS by using hard coded addresses caused these applications problems when BIOS entry point addresses changed because the jump would be to an undesired sequence of instructions or into the middle of an instruction or data where the microprocessor would erroneously interpret the target locations as an instruction. To ensure transportability of applications from the early systems to the more recent IBM PS/2 systems, the old locations corresponding to the old entry points, contain hard coded jump instructions to transfer control to the new locations of the entry points. The areas in memory which have the hard coded jumps are referred to as protected entry points.

The IBM OS/2 operating system is a multitasking operating system developed for different computers including IBM PS/2 models 50-80 computers and the IBM AT system. The use of protected entry points has been found to create a problem for such operating system. The OS/2 system maintains a PC/DOS environment. This allows customers to run old PC/DOS applications under, and provides a migration path to, the OS/2 system. In order to run protect mode operations in the background and control foreground operations in the PC/DOS environment, the OS/2 system must have full control and ownership of all system resources. To accomplish such control, the operating system intercepts all BIOS requests through the interrupt vectors and thereby controls access to system resources. If an application, executing in the PC/DOS environment, directly accesses a BIOS routine via one of the protected entry points, the system may hang or act unpredictably where the BIOS routine or a device operation has already been invoked by some other application program or requestor. The BIOS routines are not reentrant because the BIOS work areas will only support a single request at any one time, and some devices cannot handle concurrent operations. Therefore, when an application program jumps directly to a BIOS routine by use of a hard coded address, such process is transparent to the operating system and sets up the potential situation of two different programs accessing the same system resource at the same time when in fact only one program can do so. Note that IBM, AT, PS/2, and OS/2 are trademarks of International Business Machines Corporation.

SUMMARY

One of the objects of the invention is to provide, in a multitasking data processing system having protected entry points into BIOS routines, another BIOS routine that will provide a signal to the operating system, that a BIOS routine is about to be invoked through a protected entry point.

Another object is to provide a signal from a BIOS routine to the operating system that a system resource, specifically a BIOS routine, is the target of an attempt by an application program to transfer control to such BIOS routine, to thereby allow the operating system to take some action to prevent problems.

Briefly, the manner in which the above objects are achieved, is to store jump instructions at protected entry points in memory, to jump to BIOS signaling routines that, in turn, issue INT instructions for a new software interrupt called a Protected BIOS Entry Point Intercept Function, to signal the operating system that a BIOS access is being attempted. This signal indicates that an unrecommended access is about to occur and gives the operating system a chance to handle the request and control usage of the specific resource desired.

DRAWINGS

Other objects and advantages of the invention will be apparent from the following description taken in connection with the accompanying drawings wherein:

FIG. 3 is a flow diagram of the invention.

DESCRIPTION

Figure 1:
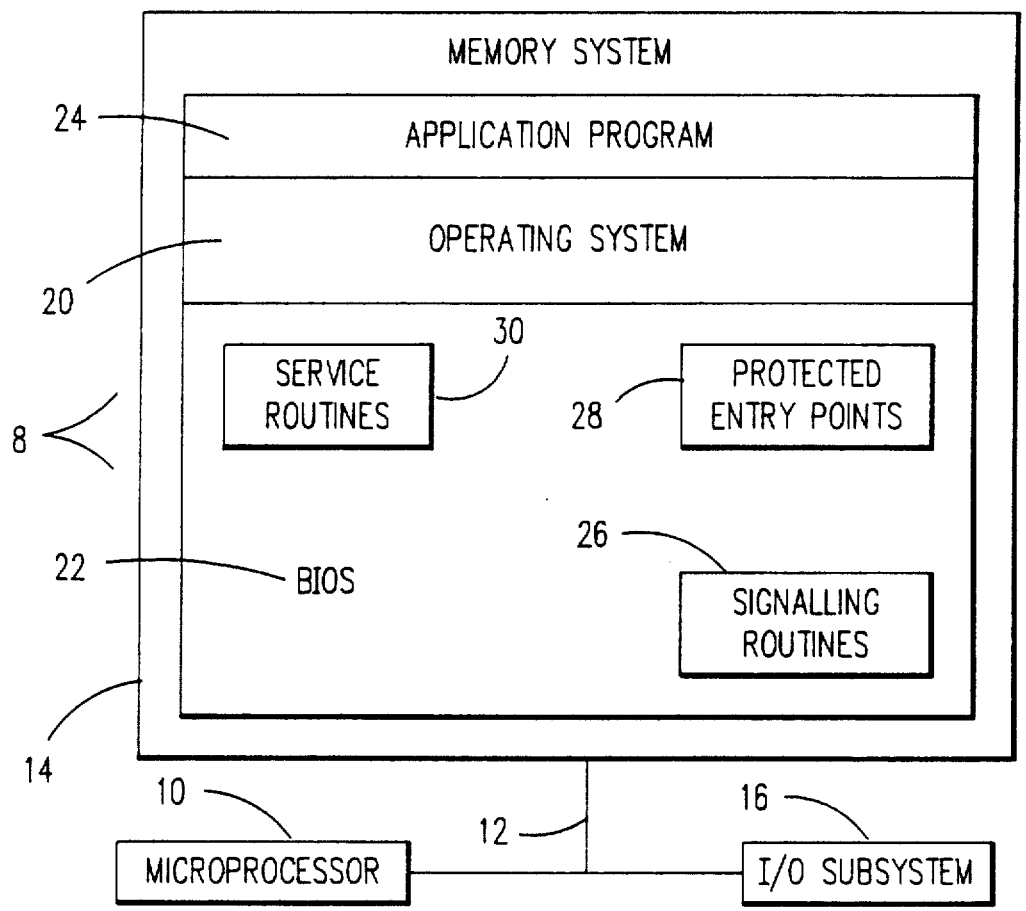
FIG. 1 is a schematic diagram of a data processing system embodying the invention.

Referring now to the drawings, FIG. 1 depicts a data processing system 8 comprising a microprocessor 10 connected over a bus system 12 to a memory system 14 and an input/output (I/0) subsystem 16, these various elements forming the hardware part of the data processing system 8. Data processing system 8 further includes a software part stored in memory system 14 and comprising an operating system (OS) 20, a BIOS 22 and at least one application program 24. The hardware part of the data processing system 8 may be any one of the aforementioned IBM PS/2 models and OS 20 is preferably the IBM OS/2 operating system. Except for the modifications to the software as described hereinafter, the hardware and software parts of system 8 are known, commercially available items so that full details thereof need not be described herein. Such modifications include the addition of BIOS signaling routines 26 and modifying protected entry points (PEP) 28 to jump to signaling routines 26 instead of to the BIOS service routines 30. As used in this application, the terms "service" and "signaling" are used to distinguish two different types of BIOS routines. A "BIOS service routine" is a known routine for interacting with the system devices, and a "BIOS signaling routine" is used to alert OS 20 to an impending hard coded access attempt as described more fully hereinafter.

As indicated previously, a multitasking operating system must control all resources in a system. If an ill-behaved application can access a resource directly without prior knowledge of the operating system, the system's integrity will be violated. This invention allows BIOS 22 to signal operating system 20 that an illegal access is about to occur and give the operating system an opportunity to handle the request. As part of the invention, a new System Service BIOS Function, Int 15 H(hexadecimal), register AH=0C5H, Protected BIOS Entry Point Intercept Function, has been created. Each entry point or protected entry point 28 vectors microprocessor 10 to a different BIOS signaling routine 26 which invokes the Protected BIOS Entry Point Intercept Function, to indicate to the interceptor, i.e. OS 20, that a ill-behaved BIOS access is being attempted.

The Protected BIOS Entry Point Intercept Function is defined below. Included are the addresses of the protected entry points in the F000 segment in memory system 14. Before the Int 15H instruction can be executed, the AH and AL registers of microprocessor 10 should be loaded as follows:

| (AH) = C5H - Protected BIOS Entry Point Intercept | |
|---|---|
| (AL) - Entry Point Tag | Offset in F000H Segment |
| = 00H - Reserved | |
| = 01H - Boot Strap | - E6F2H |
| = 02H - RS232 | - E739H |
| = 03H - Keyboard | - E82EH |
| = 04H - Diskette | - EC59H |
| = 05H - Printer | - EFD2H |
| = 06H - Video | - F065H |
| = 07H - Memory Size Determine | - F841H |
| = 08H - Equipment Determine | - F84DH |
| = 09H - Time of Day | - FE6EH |
| = 0AH thru 0FFH - Reserved | |

Upon EXIT the AH register and carry flag CY are set as follows:

| (AH) = 86H | For (AL) = 00H, 0AH thru 0FFH |
| (CY) = 1 | OR FUNCTION NOT SUPPORTED |
| (AH) = 00H | For (AL) = VALID TAG |
| (CY) = 0 | |

Since several individual BIOS 22 routines exist on the PC and XT, a mechanism to identify which BIOS routine is being directly accessed is also provided. The mechanism consists of a tag loaded into one of the microprocessor registers by a signaling routine 26. This tag represents the individual BIOS service routine that is to be accessed. There is a separate signaling routine for each tag identified above. The signaling routine builds a parameter list on the stack before invoking the Protected BIOS Entry Point Intercept Function. Upon entry to the Protected BIOS Entry Point Intercept Function, the stack contains the following information:
BIOS IP Register
BIOS CS Register
BIOS Flags
Caller AX Register
Caller IP Register
Caller CS Register
Caller Flags Caller is the application program directly accessing the protected entry point, and BIOS is the specific signaling routine at that entry point.

The operating system loads a PEP intercept function for each tag desired, at initialization. Once operating, OS 20 can elect to intercept and execute its own device routine on a per tag basis or it can let BIOS handle the request. To do the former, the operating system returns to the Caller (via the stack parameters above) as opposed to BIOS, and is responsible for normalizing the stack. No matter which BIOS function is intercepted, the operating system must adhere to the interface for that function on that particular system when returning to the caller. BIOS interface definitions can be found in the IBM Personal System/2 and Personal Computer BIOS Interface Technical Reference Manual. If the operating system chooses not to intercept the request for that service, the operating system simply returns from the specific signaling routine to the intended BIOS, preserving all registers including the flags register. BIOS Int 15h must range check the tag values and if out of range return the indicated errors. The various PEP intercept functions will obviously differ in accordance with the characteristics of the different system resources. Described hereinafter is an example of the function provided for diskette services. The description is of a hard code jump instruction, its associated specific signaling routine and the Protected BIOS Entry Point Intercept Function. The instructions are in assembly language for the microprocessor 10.

| BIOS Protected Entry Point Example: Hard Coded Jump | | | |
|---|---|---|---|
| NEW | | OLD | |
| ORG | 0EC59H | ORG | 0EC59H |
| JMP | DISKETTE_IO_2 | JMP | DISKETTE_IO_1 |

DISKETTE_IO_2 represents the address of the BIOS diskette signaling routine which will be jumped to upon execution of the JMP instruction, whereas DISKETTE_IO_1 represents the address of the diskette service routine which will no longer be jumped to because of the new JMP instruction.

```
Diskette BIOS Signaling Routine:
DISKETTE_IO_2    EQU              $
PUSH             AX               ; SAVE ORIGINAL FUNCTION
                                  ; CALL
MOV              AH,0C5H          ; OUTPUT SIGNAL FOR ENTRY
                                  ; POINT INTERCEPT
MOV              AL,DISKETTE_TAG  ; ENTRY POINT TAG FOR
                                  ; DISKETTE
INT              15H              ; INVOKE INTERCEPT FUNCTION
POP              AX               ; RESTORE ORIGINAL FUNCTION
                                  ; CALL
JMP              DISKETTE_IO_1    ; GO TO ORIGINAL
DESTINATION
Interceptor Protected Entry Point Example:
CMP              AH,0C5H          ; ENTRY POINT INTERCEPT
                                  ; FUNCTION ?
JNE              NOT_MINE         ; NO
CMP              AL,MY_TAG        ; TAG LOOKING FOR ?
JNE              NOT_MINE         ; NO
                                  ; HANDLE REQUESTED ACCESS
ADD              SP,4*2           ; NORMALIZE STACK
EXIT                              ; RETURN TO CALLER
NOT_MINE:
EXIT                              ; RETURN TO CALLER
-or-
PASS CONTROL TO NEXT IN INT 15H CHAIN
```

Figure 2:
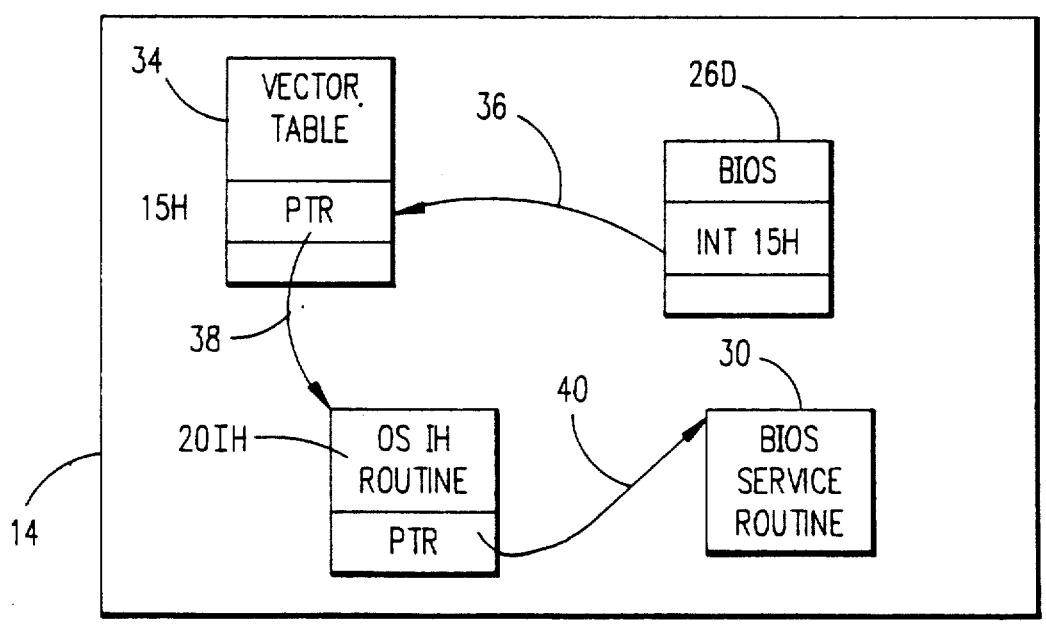
FIG. 2 is a schematic diagram showing the relationship of certain aspects of the invention.

In order to carry out the invention, data processing system 8 is started in the usual manner and the various loadable programs are stored in memory. A vector table 34 is created (see FIG. 2) which holds a series of pointers at indexed locations including a pointer 38 to the start of an operating system interrupt handling (OS IH) routine 20IH for handling the new software interrupt of the invention. Pointer 38 is located at indexed location 15H. When the INT 15H instruction is executed in signaling routine 26D, microprocessor 10 accesses pointer 38, as shown schematically via line 36, to then start executing routine 20IH. This routine contains a pointer 40 to link routine 20IH with the desired BIOS service routine 30.

The various steps of the invention that occur as a result of execution of an exemplary application program 24 will now be described with reference to FIG. 3. It is assumed that the application program will attempt to access a BIOS service routine for diskette functions that is stored in the system at an address corresponding to DISKETTE_IO_1 and the BIOS signaling routine corresponding to such function is identified as routine 26D. It should be obvious to those skilled in the art that similar routines can be used for other BIOS functions. In step 44, after the application program 24 has set up the parameters appropriate to the BIOS service being requested, a hard coded jump instruction is executed which causes a jump to a PEP 28. Then step 46 uses the jump instruction at such protected entry point to jump to BIOS signaling routine 26D which includes the instruction previously described. During the course of execution, microprocessor register AH is set to "C5H" which is the specific signal to be used to indicate that such an access is being attempted. Thereafter, the INT instruction transfers control to routine 20IH.

FIG. 3 illustrates in flow chart form the various steps and functions performed by routine 20IH. The first step 50 decides whether the OS should handle the I/0 request or not. If not, step 52 returns control to signaling routine 26D which then completes and transfers control in step 54 to the BIOS service routine at DISKETTE_IO_1. Upon completion thereof, step 56 returns control to application program 24. If step 50 decides that the OS will handle the request further, then step 58 proceeds with processing the I/0 operation desired. Step 60 decides if the processing only involves synchronizing operation of the diskette such as in the event the diskette is already busy. If so, step 62 waits for completion of the synchronizing event, e.g., completion of a prior access, and then returns control to the signaling routine 26D to proceed in the manner previously described. If more than simple synchronization is needed, then step 64 will handle such function as appropriate and the step 66 returns control to the application program.

With adding the individual signaling routines, targeting the protected entry point to the signaling routines and architecting the Protected BIOS Entry Point Intercept Function, the operating system is provided an effective method of managing and owning all system resources. By intercepting the Int 15H vector, the operating system can detect any direct access attempt and handle it in an appropriate manner. It should be apparent to those skilled in the art that changes can be made in the details of the invention without departing from the scope of the invention as defined in the appended claims.

What is claimed is:

1. In a data processing system having a microprocessor; I/O device; and a memory system for storing a plurality of BIOS routines for controlling operation of said I/O devices, a plurality of application programs including interrupt instructions and hard coded instructions for initiating transfer of control to said BIOS routines, and a multitasking operating system including a plurality of interrupt instructions in a application programs for calling said BIOS routine; said memory system having a plurality of protected entry points to which control is transferred by said hard coded instructions, the improvement comprising:

first means in said memory system for storing a signalling routine for alerting said operating system of attempting access to said BIOS routines through said protected entry points;

second means in said memory system means for storing at said protected entry points jump instructions operative when control is transferred thereto by said hard coded instructions to transfer control to said signalling routine;

said operating system being operable in response to being alerted by said signalling routine to control use of an I/O device, the operation of which is controlled by one of said BIOS routines, and operable in response to said signalling routine to transfer control to said BIOS routines; and said application programs including information associated with said hard coded instructions to uniquely identify which specific BIOS routines are to be accessed.

* * * * *